Sept. 2, 1952  A. B. SOWTER  2,608,887
MEANS FOR COLD PRESSURE WELDING
Filed Feb. 4, 1950

INVENTOR
ANTHONY BAGNOLD SOWTER
BY
ATTORNEY

Patented Sept. 2, 1952

2,608,887

UNITED STATES PATENT OFFICE 2,608,887

MEANS FOR COLD PRESSURE WELDING

Anthony Bagnold Sowter, Wembley, England, assignor to The General Electric Company Limited, London, England Application February 4, 1950, Serial No. 142,389
In Great Britain March 28, 1949

6 Claims. (Cl. 78—89)

1

This invention relates to tools for cold pressure welding, more particularly to the making of cold weld connections of the type where a first member is to be joined to a flange or similar lateral projection of a second member.

In the welding together of aluminum, aluminum alloys and other metals capable of being cold pressure welded, where a member is to be welded around or to the end of another part, particularly a tubular part, the member engaging an inturned flange on the part and welding pressure being applied across the superposed member and flange, there is often the tendency for the metal of the part to be forced or flow in a direction away from the flange and so to produce a bump at the end of the part. Thus, where a closure disc is being welded to the bottom of the wall of a can, the bottom being turned inwardly, the bottom of the wall tends to splay out a certain extent on welding.

This is undesirable in certain cases particularly where a tubular part is seam welded and an object of the present invention is the provision of a tool for cold pressure welding which avoids this defect.

The invention, both as to its further objects and details will be better understood from the following detailed description of a practical embodiment in connection with the accompanying drawing, forming part of this specification and wherein.

Like reference characters identify like parts in the different views of the drawing.

According to the present invention, the tool or anvil upon which the inturned flange of the part rests during welding is recessed, the wall of the recess being arranged to prevent splaying out of metal of the part and to constrain the metal to flow, if at all, in the direction in which the pressure for cold welding is applied.

2

If a closure disc is to be welded into the bottom of a tubular part provided with an inturned flange, the said tool or anvil will have a recess into which the bottom of the tubular part fits, a pressure applying tool passing down inside the tubular part. In this manner, the bottom of the tube will be contained by said anvil, to substantially prevent distortion or splaying out of metal beyond the contour thereof.

Where the outside of the flange is radiused, the height of the recess should only be such that the top of the recess is level with the top of the radiused part so that, on welding, no metal is as it were trapped at the top of the recess to make removal of the welded part and member difficult.

The invention may be applied particularly to the manufacture of cans of circular section but it can also be applied to the manufacture of cans of other sections, such as rectangular. Where the wall of a can is seam welded by cold pressure welding, since splaying of metal is prevented, there is no tendency for opening of the seam when welding a closure disc in the bottom of the can.

Figure 1:
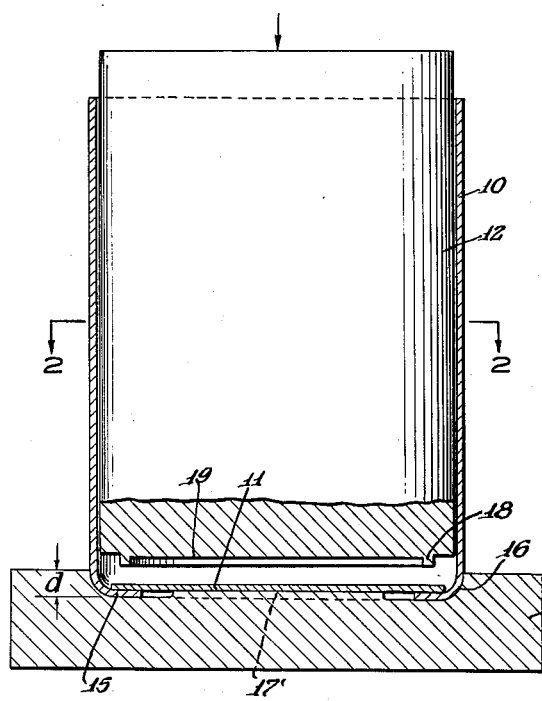
Figure 1 is a vertical cross section of a tool assembly for joining a bottom or end member to an inturned flange of a tube by cold pressure welding in accordance with the invention.
Figure 2:
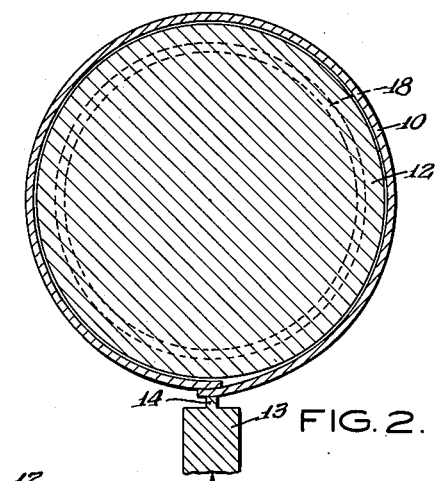
Figure 2 is a horizontal cross section showing a tool for producing the tube of Figure 1 by cold pressure welding.

In carrying the invention into effect, according to one example of construction as shown in the drawing, a circular section can 10 has a closure disc 11 welded into its bottom by a tool in accordance with the invention. The can is made from aluminium or other metal capable of cold pressure welding and the wall or cylindrical part of the can is advantageously made by rolling a strip of aluminum around a mandrel (see Figure 2) of right circular section and making a seam weld or lap joint by cold pressure welding. The mandrel 12 itself may form an anvil cooperating with a shouldered cold pressure welding tool or die 13 formed with a suitably shaped flat welding tip 14 which makes the actual weld upon application of suitable pressure in the direction indicated by the arrow in the drawing.

After seam welding, the excess metal is cleaned or filed off at the seam. A small amount of excess metal may be left on the inside of the wall, particularly at the ends of the seam, in order possibly to aid making a reliable weld when the end closure discs are applied.

One end of the wall is then turned over inwardly to provide a flange 15, the outside of the bottom being suitably radiused as at 16. The inside surface of the flange is then cleaned such as by scratch brushing to remove any oxide film or other surface contamination from the surface. The bottom of the wall is then set in a recessed tool 17 or anvil which exactly fits or conforms to said bottom, the height of $d$ the recess being such that its top is just level with the end of the radiused part 16 of the flange 15. The anvil 17 may be of mild steel and may be set in a press.

A closure disc 11 which just fits inside the wall 10 of the can also has its edge cleaned by scratch brushing or the like and is then laid down on the inside surface of the flange. A pressure applying tool 12 is brought down into the inside of the wall 10 of the can to cold weld the edge of the disc to the flange. This tool which may be the same mandrel or anvil used in producing the cylindrical part 10 as described in connection with Figure 2, should be a good sliding fit in the wall and consists of a member of mild steel, circular in section, and having on its bottom an annular axially projecting flange or rib 18 which forms the pressure applying means and which has a flat edge of the required width, about 1½ times the combined thickness of the closure disc and flange. Radially inwards of the shoulder is a circular projecting portion 19 which engages the closure disc but projects by a smaller distance than does the rib 18 from the bottom of the member 12. For this purpose, the bottom wall of the recess in the tool or anvil 17 advantageously has a raised central portion 17' of a height equal to the thickness of the flange 15, to prevent distortion of the disc 11 by the projection 19 during the welding operation. In this manner the projecting portion 19 serves to limit and accurately control the percentage reduction during welding. The latter has been found critical in order to produce an efficient cold weld connection and amounts to a minimum of about 70% of the total thickness of the members 11 and 15 in case of aluminum.

The annular rib 18 engages the edge of the disc 11 just above the flange 15 on the wall bottom and the disc is welded to the flange with no splaying of metal at the bottom of the wall. Actually, the wall is forced up slightly out of the recess by the welding process but, unlike a splaying action, this has no serious effect on the seam weld in the wall since, as the metal is flowing in the direction in which pressure is applied for welding, that is parallel to the axes of the tools, the seam weld is merely stretched along its length. In other words, the recess in the tool 17 restricts and diverts the metal flow around the bent 16 connecting the flange 15 with the container wall 10, in such a manner as to substantially prevent outward splaying of said bent during welding. Instead of leaving excess metal on the inside of the wall to improve the weld at the seam, filler metal may be added there.

Figure 4:
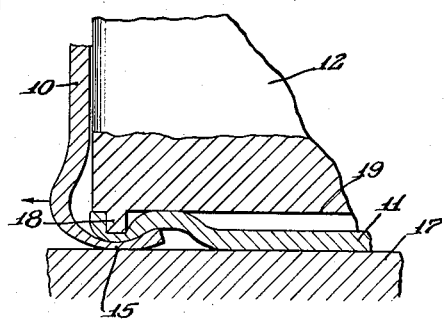
Figures 4 and 5 are enlarged fractional views showing a completed cold weld joint without and with the improvement of the invention, respectively.
Figure 5:
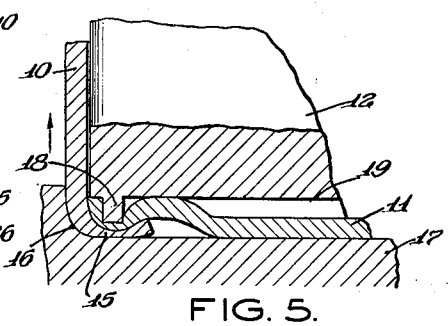

Figures 4 and 5 show more clearly the completed cold weld joint obtained without and with the containing means according to the invention, respectively. When using a flat anvil 17, as shown in Figure 4, the metal of the lower flanged part 16 of the can 10 is distorted or forced in a direction away from the flange, as indicated by the arrow in the drawing, thus leaving a bump or projection at the end of the can. Figure 5 shows the effect of the recessed tool or anvil according to the invention by restraining the flow of the metal in a direction substantially parallel to the application of the welding pressure, as indicated by the arrow, thus preventing distorting or splaying out of the lower end of the can beyond the contour thereof.

Figure 3:
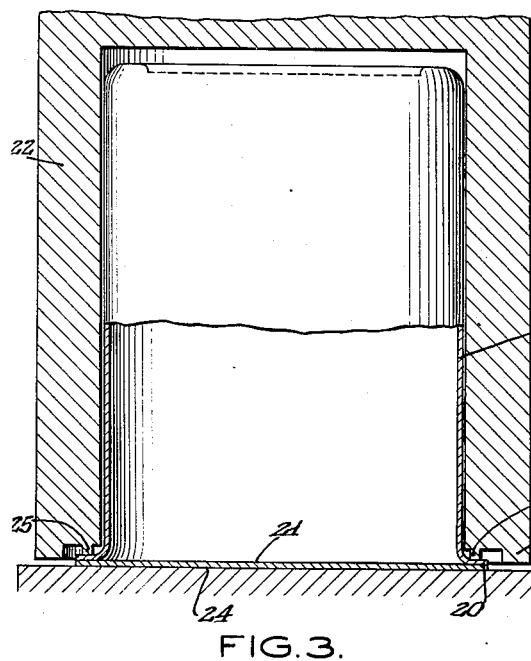
Figure 3 is a vertical cross sectional through a further tool assembly for joining the top to the tube shown in Figure 1 by cold pressure welding, to produce a sealed can or container.

After making the weld, the inner tool is removed, the welded wall and disc removed from the recess in the anvil 17. The top of the wall 10 is turned outwardly to form a flange 20 as shown in Figure 3. A further closure disc 21 with a filling hole is laid on this flange after the flange and edge of the disc have been cleaned by scratch-brushing or the like and then the disc welded to the flange by means of a hollow cylindrical tool 22 which passes down over the bottom of the can and applies welding pressure against a flat anvil 24. This cylindrical tool has an annular welding rib 25 with a flat tip and, radially outwards of said rib, a surface or shoulder 26 which projects a sufficient distance beyond the rib to control and limit the percentage reduction of the total thickness of the flange 20 and disc 21 on welding by engaging the flat anvil 24. The hollow cylindrical tool 22 is then withdrawn and the completed can removed from the press.

As will be understood, the special ring-shaped welding tool or die 12 may be used for cold welding together any other pair of superposed members such as sheets, discs, rings or the like, with the rib 18 serving to define the pressure applying or operative welding area, in the manner described, and with the projecting portion 19 acting as an abutment or limit to control the percentage reduction of the total work thickness at the welding area. In place of the annular shape as shown, the tool may be designed for effecting a cold weld along any other closed or endless weld line or trace, such as for producing ellipsoidal, square or rectangular cold weld connections, depending upon the construction and shape of the members to be welded together.

While there has been disclosed and described a desirable embodiment of the invention, it will be evident from the foregoing that changes in the size, shape and arrangement of parts, as well as the substitution of equivalent elements and steps for those described herein, may be made without departing from the scope and spirit of the invention as set forth in the appended claims. Thus, it will be understood that the invention has general use and application wherever one member is to be cold welded close to and onto a flange or other lateral projection of a second member and where the danger exists of the first member being distorted or splayed as a result of the cold welding operation. By the use of a specially designed recessed tool or containing means according to the present invention, this difficulty is greatly minimized or prevented, independently of the remaining part or shape of the members being joined. The specification and drawing are accordingly to be regarded in an illustrative rather than in a limiting sense.

I claim:

1. Pressure welding apparatus for lap joining a first member to an angular flange of a second member, said members consisting of pressure weldable metal, comprising first pressure welding tool means having a recess conforming to the bent formed by said flange and second member, to receive and contain said bent with said flange resting upon the bottom of said recess, and a cooperating welding tool for pressure welding said first member to said flange, said recess substantially restricting and diverting metal flow around said bent, to prevent outward splaying thereof during welding.

2. Pressure welding apparatus for lap joining a first member to an angular flange of a second member, said members consisting of pressure weldable metal and said flange being connected with said second member through a radiused bent, comprising first pressure welding tool means having a recess conforming to said bent, to receive and contain said bent with said flange resting upon the bottom of said recess, and a cooperating welding tool for pressure welding said first member to said flange, said recess substantially restricting and diverting metal flow around said bent, to prevent outward splaying thereof at welding.

3. Pressure welding apparatus for lap joining a closure disc to the inturned flange provided at the end of a tubular member, said disc and member consisting of pressure weldable metal, comprising first pressure welding tool means having a recess conforming to the bent formed by said flange and member, to receive and contain said bent with said flange resting upon the bottom of said recess, and a cylindrical cooperating pressure tool arranged to slide within said tube and havng ga projecting annular welding rib, for pressure welding said disc to said flange, said recess substantially restricting and diverting metal flow around said bent, to prevent outward splaying thereof during welding.

4. Pressure welding apparatus for lap joining a closure disc to the inturned flange provided at the end of a tubular member, said disc and member consisting of pressure weldable metal and said flange and member forming a radiused bent, comprising first pressure welding tool means having a recess conforming to said bent, to receive and contain said bent with said flange resting upon the bottom of said recess, and a cylindrical cooperating pressure tool arranged to slide within said tube and having a projecting annular welding rib, for pressure welding said disc to said flange, said recess substantially restricting and diverting metal flow around said bent, to prevent outward splaying thereof during welding.

5. Pressure welding apparatus for lap joining a closure member to the inturned flange provided at the edge of a container wall forming a bent therewith, said member and container consisting of pressure weldable metal, comprising first pressure welding tool means having a recess conforming to said bent, to receive and contain said bent with said flange resting upon the bottom of said recess, and a cooperating pressure tool arranged to slide within said container and having a projecting welding rib for pressure welding said member to said flange, said recess substantially restricting and diverting metal flow around said bent, to prevent outward splaying thereof during welding.

6. Pressure welding apparatus for lap joining a closure member to the inturned flange provided at the edge of a container wall, said member and container consisting of pressure weldable metal and said wall and flange forming a radiused bent, comprising first welding tool means having a recess conforming to said bent, to receive and contain said bent with said flange resting upon the bottom of said recess, and a cooperating pressure tool arranged to slide within said container and having a projecting welding rib for pressure welding said flange to said member, said recess substantially restricting and diverting metal flow around said bent, to prevent outward splaying thereof during welding.

ANTHONY BAGNOLD SOWTER.

REFERENCES CITED

The following references are of record in the file of this patent:

UNITED STATES PATENTS

| Number | Name | Date |
| --- | --- | --- |
| 2,522,408 | Sowter | Sept. 12, 1950 |